US 6,528,157 B1

(12) United States Patent
Hussain et al.

(10) Patent No.: US 6,528,157 B1
(45) Date of Patent: Mar. 4, 2003

(54) PROPPANTS WITH FIBER REINFORCED RESIN COATINGS

(75) Inventors: Hamid Hussain, Bolingbrook, IL (US); Robert R. McDaniel, Houston, TX (US); Michael J. Callanan, Houston, TX (US)

(73) Assignee: Borden Chemical, Inc., Columbus, OH (US)

( * ) Notice: Subject to any disclaimer, the term of this patent is extended or adjusted under 35 U.S.C. 154(b) by 1179 days.

(21) Appl. No.: 08/641,827

(22) Filed: May 2, 1996

Related U.S. Application Data

(60) Provisional application No. 60/007,186, filed on Nov. 1, 1995.

(51) Int. Cl.[7] .............................................. B32B 18/00
(52) U.S. Cl. ...................... 428/325; 428/326; 428/327; 428/406; 428/407; 524/494; 524/495; 523/131; 523/132
(58) Field of Search ................................. 428/325, 326, 428/327, 403, 404, 406, 407; 524/492, 493, 494, 495, 496; 523/130, 131, 132

(56) References Cited

U.S. PATENT DOCUMENTS

| | | | |
|---|---|---|---|
| 2,952,318 A | 9/1960 | Ritch | 166/15 |
| 3,175,616 A | 3/1965 | Huitt et al. | 166/42 |
| 3,593,798 A | 7/1971 | Darley | 166/295 |
| 3,659,651 A | 5/1972 | Graham | 166/280 |
| 3,720,540 A * | 3/1973 | Wimmer | 117/139 |
| 3,854,533 A | 12/1974 | Gurley et al. | 166/276 |
| 3,888,311 A * | 6/1975 | Cooke, Jr. | 166/280 |
| 3,891,565 A | 6/1975 | Colpoys | 252/8.55 R |
| 3,929,191 A | 12/1975 | Graham et al. | 166/276 |
| 3,973,627 A | 8/1976 | Hardy et al. | 166/276 |
| 4,109,721 A | 8/1978 | Slusser | 166/280 |
| 4,439,489 A | 3/1984 | Johnson et al. | 428/404 |
| 4,493,875 A | 1/1985 | Beck et al. | |
| 4,518,039 A | 5/1985 | Graham et al. | 166/276 |
| 4,527,627 A * | 7/1985 | Graham et al. | 166/280 |
| 4,552,815 A | 11/1985 | Dreher et al. | |
| 4,564,459 A | 1/1986 | Underdown et al. | 252/8.55 R |
| 4,623,021 A | 11/1986 | Stowe | 166/250 |
| 4,665,988 A | 5/1987 | Murphey et al. | 166/295 |
| 4,694,905 A | 9/1987 | Armbruster | 166/280 |
| 4,708,206 A | 11/1987 | Jennings, Jr. et al. | 166/281 |
| 4,785,884 A | 11/1988 | Armbruster | 166/280 |

(List continued on next page.)

FOREIGN PATENT DOCUMENTS

| | | |
|---|---|---|
| EP | 619415 | 10/1994 |
| GB | 2277112 | 9/1993 |

OTHER PUBLICATIONS

A Novel Technology to Control Proppant Backproduction (SPE 31007), R.J. Card et al, Journal SPE Productions and Facilities, vol. 10,. No. 4, p. 271–76, Nov. 1995.
"Phenolic Resins," A. Knop, L.A. Pilato; pp. 50–53, 1985.
"Recommended Practices for Testing High Strength Proppants Used in Hydraulic Fracturing Operations," American Petroleum Institute, pp. 11 and 14–16, 1989.

*Primary Examiner*—James J. Seidleck
*Assistant Examiner*—U. K. Rajguru
(74) *Attorney, Agent, or Firm*—Stevens, Davis, Miller & Mosher, LLP

(57) ABSTRACT

Coated particles made of particulate substrates having a coating of resin and fibrous material are provided for use in subterranean formations. The coated substrate particles are proppants useful to prop open subterranean formation fractures. The coated substrate particles are also useful for sand control, that is, acting as a filter or screen to prevent backwards flow of sand, other proppants or subterranean formation particles. Methods of making the coated particles are also disclosed.

49 Claims, 2 Drawing Sheets

U.S. PATENT DOCUMENTS

| | | |
|---|---|---|
| 4,869,960 A | 9/1989 | Gibb et al. |
| 4,875,525 A | 10/1989 | Mana .......................... 166/280 |
| 4,888,240 A | 12/1989 | Graham et al. |
| 4,923,714 A * | 5/1990 | Gibb et al. ................. 427/221 |
| 5,218,038 A | 6/1993 | Johnson et al. ............. 524/541 |
| 5,222,558 A | 6/1993 | Montgomery et al. ...... 166/278 |
| 5,251,697 A | 10/1993 | Shuler ......................... 166/268 |
| 5,256,703 A * | 10/1993 | Hermann et al. ........... 521/120 |
| 5,330,005 A | 7/1994 | Card et al. .................. 166/280 |
| 5,381,864 A | 1/1995 | Nguyen et al. .............. 166/280 |
| 5,422,183 A | 6/1995 | Sinclair et al. .............. 428/403 |
| 5,425,994 A | 6/1995 | Harry et al. |
| 5,439,055 A | 8/1995 | Card et al. .................. 166/280 |
| 5,501,275 A | 3/1996 | Card et al. .................. 166/280 |
| 5,551,514 A * | 9/1996 | Nelson et al. ............... 166/280 |
| 5,597,784 A | 1/1997 | Sinclair et al. |
| 5,921,317 A | 7/1999 | Dewprashad et al. |

\* cited by examiner

PROPPANTS WITH FIBER REINFORCED RESIN COATINGS

This claims priority under 35 U.S.C. 119 from U.S. provisional patent application Ser. No. 60/007,186, filed Nov. 1, 1995.

BACKGROUND OF THE INVENTION

1. Field of the Invention

The present invention is directed to particulate substrates coated with a resin comprising phenolic-aldehyde polymer or other suitable polymer. Depending upon the resin selected, the substrate selected and how the resin is combined with the substrate, the resulting resin coated particle is useful in either subterranean formations as a curable proppant or a precured proppant. The present invention also relates to methods of making or using the resins or coated substrates.

2. Description of Background Art

The use of phenolic resin coated proppants is disclosed by U.S. Pat. No. 5,218,038 to Johnson et al (the disclosure of which is incorporated by reference in its entirety). In general, proppants are extremely useful to keep open fractures imposed by hydraulic fracturng upon a subterranean formation, e.g., an oil or gas bearing strata Typically, the fracturing is desired in the subterranean formation to increase oil or gas production. Fracturing is caused by injecting a viscous fracturing fluid or a foam at high pressure into the well to form fractures. As the fracture is formed, a particulate material, referred to as a "propping agent" or "proppant" is placed in the formation to maintain the fracture in a propped condition when the injection pressure is released. As the fracture forms, the proppants are carried into the well by suspending them in additional fluid or foam to fill the fracture with a slurry of proppant in the fluid or foam. Upon release of the pressure, the proppants form a pack which serves to hold open the fractures. The goal of using proppants is to increase production of oil and/or gas by providing a highly conductive channel in the formation. Choosing a proppant is critical to the success of well stimulation.

The propped fracture thus provides a highly conductive channel in the formation. The degree of stimulation afforded by the hydraulic fracture treatment is largely dependent upon formation parameters, the fracture's permeability and the fracture's propped width. If the proppant is an uncoated substrate and is subjected to high stresses existing in a gas/oil well, the substrate may be crushed to produce fines of crushed proppant. Fines will subsequently reduce conductivity within the proppant pack. However, a resin coating will enhance crush resistance of a coated particle above that of the substrate alone.

Known resins used in resin coated proppants include epoxy, furan, phenolic resins and combinations of these resins. The resins are from about 1 to about 8 percent by weight of the total coated particle. The particulate substrate may be sand, ceramics, or other particulate substrate and has a particle size in the range of USA Standard Testing screen numbers from about 8 to about 100 (i.e. screen openings of about 0.0937 inch to about 0.0059 inch).

Resin coated proppants come in two types: precured and curable. Precured resin coated proppants comprise a substrate coated with a resin which has been significantly crosslinked. The resin coating of the precured proppants provides crush resistance to the substrate. Since the resin coating is already cured before it is introduced into the well, even under high pressure and temperature conditions, the proppant does not agglomerate. Such precured resin coated proppants are typically held in the well by the stress surrounding them. In some hydraulic fracturing circumstances, the precured proppants in the well would flow back from the fracture, especially during clean up or production in oil and gas wells. Some of the proppant can be transported out of the fractured zones and into the well bore by fluids produced from the well. This transportation is known as flow-back.

Flowing back of proppant from the fracture is undesirable and has been controlled to an extent in some instances by the use of a proppant coated with a curable resin which will consolidate and cure underground. Phenolic resin coated proppants have been commercially available for some time and used for this purpose. Thus, resin-coated curable proppants may be employed to "cap" the fractures to prevent such flow back. The resin coating of the curable proppants is not significantly crosslinked or cured before injection into the oil or gas well. Rather, the coating is designed to crosslink under the stress and temperature conditions existing in the well formation. This causes the proppant particles to bond together forming a 3-dimensional matrix and preventing proppant flow-back.

These curable phenolic resin coated proppants work best in environments where temperatures are sufficiently high to consolidate and cure the phenolic resins. However, conditions of geological formations vary greatly. In some gas/oil wells, high temperature (>180° F.) and high pressure (>6,000 psi) are present downhole. Under these conditions, most curable proppants can be effectively cured. Moreover, proppants used in these wells need to be thermally and physically stable, i.e. do not crush appreciably at these temperatures and pressures.

Curable resins include (i) resins which are cured entirely in the subterranean formation and (ii) resins which are partially cured prior to injection into the subterranean formation with the remainder of curing occurring in the subterranean formation.

My shallow wells often have downhole temperatures less than 130° F., or even less than 100° F. Conventional curable proppants will not cure properly at these temperatures. Sometimes, an activator can be used to facilitate curing at low temperatures. Another method is to catalyze proppant curing at low temperatures using an acid catalyst in an overflush technique. Systems of this type of curable proppant have been disclosed in U.S. Pat. No. 4,785,884 to Armbruster and the disclosure of this patent is incorporated by reference in its entirety. In the overflush method, after the curable proppant is placed in the fracture, an acidic catalyst system is pumped through the proppant pack and initiates the curing even at temperatures as low as about 70° F. This causes the bonding of proppant particles.

Due to the diverse variations in geological characteristics of different oil and gas wells, no single proppant possesses all properties which can satisfy all operating requirements under various conditions. The choice of whether to use a precured or curable proppant or both is a matter of experience and knowledge as would be known to one skilled in the art.

In use, the proppant is suspended in the fracturing fluid. Tbus, interactions of the proppant and the fluid will greatly affect the stability of the fluid in which the proppant is suspended. The fluid needs to remain viscous and capable of carrying the proppant to the fracture and depositing the proppant at the proper locations for use. However, if the fluid prematurely loses its capacity to carry, the proppant may be deposited at inappropriate locations in the fracture or the well bore. This may require extensive well bore cleanup and removal of the mispositioned proppant.

It is also important that the fluid breaks (undergoes a reduction in viscosity) at the appropriate time after the proper placement of the proppant. After the proppant is placed in the fracture, the fluid shall become less viscous due to the action of breakers (viscosity reducing agents) present in the fluid. This permits the loose and curable proppant particles to come together, allowing intimate contact of the particles to result in a solid proppant pack after curing. Failure to have such contact will give a much weaker proppant pack.

Foam, rather than viscous fluid, may be employed to carry the proppant to the fracture and deposit the proppant at the proper locations for use. The foam is a stable foam that can suspend the proppant until it is placed into the fracture, at which time the foam breaks. Agents other than foam or viscous fluid may be employed to carry proppant into a fracture where appropriate.

Also, resin coated particulate material, e.g., sands, may be used in a wellbore for "sand control." In this use, a cylindrical structure is filled with the proppants, e.g., resin coated particulate material, and inserted into the wellbore to act as a filter or screen to control or eliminate backwards flow of sand, other proppants, or subterranean formation particles. Typically, the cylindrical structure is an annular structure having inner and outer walls made of mesh. The screen opening size of the mesh being sufficient to contain the resin coated particulate material within the cylindrical structure and let fluids in the formation pass therethrough.

While useful proppants are known, it would be beneficial to provide proppants having improved features such as reduced flow-back, increased compressive strength, as well as higher long term conductivity, i.e., permeability, at the high closure stresses present in the subterranean formation. Reduced flow-back is important to keep the proppant in the subterranean formation. Improved compressive strength better permits the proppant to withstand the forces within the subterranean formation. High conductivity is important because it directly impacts the future production rate of the well.

OBJECTS OF THE INVENTION

It is an object of the present invention to provide proppants coated with fiber-containing polymer.

It is another object of the present invention to provide curable proppants coated with fiber-containing phenol-aldehyde novolac polymer.

It is another object of the present invention to provide precured proppants coated with fiber-containing phenol-aldehyde resole polymer.

It is another object of the present invention to provide methods of using proppant coated with a fiber-containing polymer.

It is another object of the present invention to provide methods of using proppant coated with a fiber-containing polymer.

These and other objects of the present invention will become apparent from the following specification.

SUMMARY OF THE INVENTION

Figure 1A:
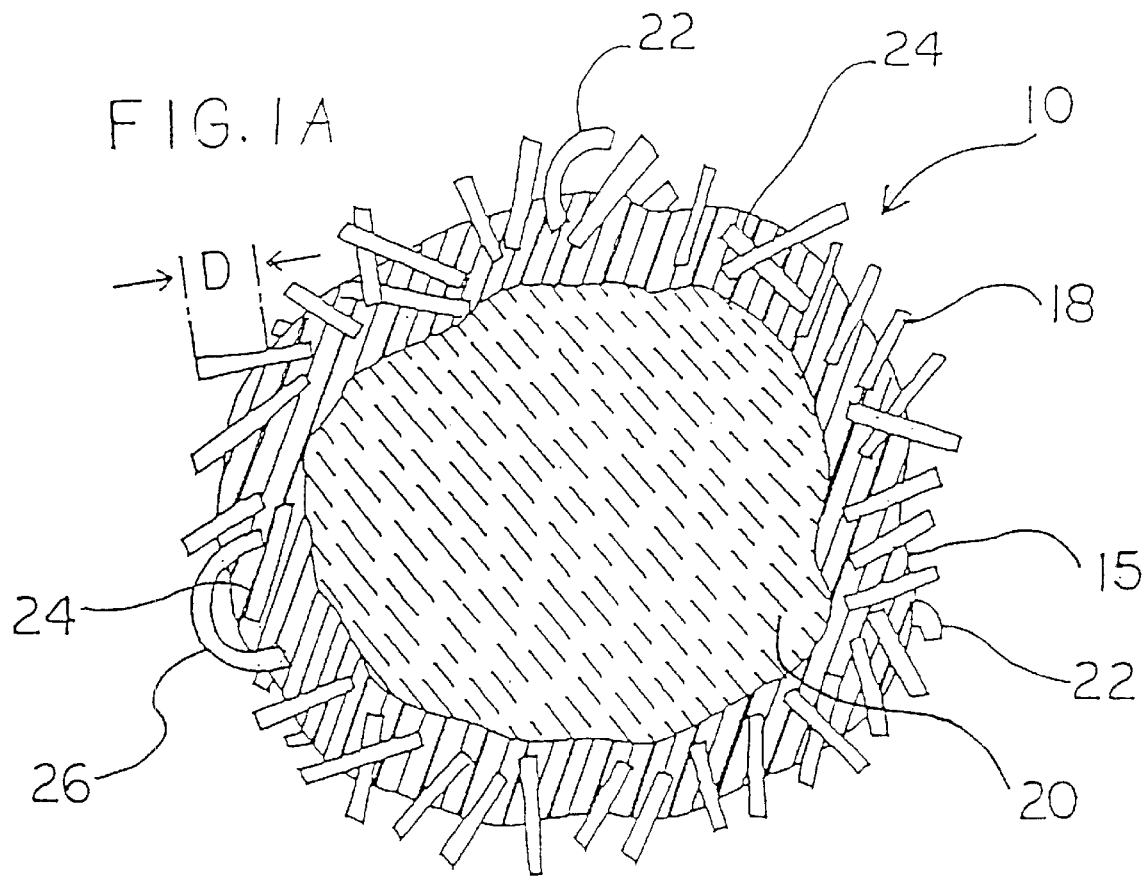
FIG. 1A shows a schematic drawing of a first embodiment of a resin coated particle of the present invention for use as a proppant.

The invention provides an improved resin-coated proppant comprising a particulate substrate e.g., sand, and a fiber-containing resin. The resin may be any conventional proppant resin. A typical proppant resin is a phenolic novolac resin coating composition combined with hexamethylenetetnine (HEXA), formaldehyde, paraformaldehyde, oxazolidines, phenol-aldehyde resole polymers and/or other known curing agents as a cross-linking agent to achieve a precured or curable proppant.

The proppant resin comprises any of a phenolic novolac polymer; a phenolic resole polymer; a combination of a phenolic novolac polymer and a phenolic resole polymer; a precured resin made of cured furan resin or a combination of phenolic/furan resin (as disclosed by U.S. Pat. No. 4,694,905 to Armbruster incorporated herein by reference); or a curable resin made of furan/phenolic resin which is curable in the presence of a strong acid (as disclosed by U.S. Pat. No. 4,785,884 to Armbruster incorporated herein by reference). The phenolics of the above-mentioned novolac or resole polymers may be phenolic moieties or bis-phenolic moieties.

The fibers may be any of various kinds of commercially available short fibers. Such fibers include at least one member selected from the group consisting of milled glass fibers, milled ceramic fibers, milled carbon fibers and synthetic fibers, having a softening point above typical starting sand temperature for coating, e.g., at least about 200° F. so as to not degrade, soften or agglomerate.

The present invention achieves curable proppants having higher compressive strengths and thus reduced flow-back. These stronger fiber reinforced coated proppants will better withstand the closure stress exerted in the fracture. This will help in maintaining better conductivity and permeability of the formation for a longer time.

The present invention also provides precured proppant with better resistance to flow-back. The resistance to flow-back is especially achieved where at least a portion of the fibers protrude from the resin coating to interlock with fibers of other proppant particles. An advantage of employing fiber-laden precured proppant, over curable coated proppant (which are fiber free) is that it works at any temperature. In contrast, curable resin coated sand only works where downhole temperatures are high enough to cure the resin or in the presence of added activators or acid catalyst (discussed above). Fiber-laden precured proppants are also different from, and better than, proppant systems of physical loose mixtures of sand and fibers. Such physical mixtures may segregate and thus achieve reduced effectiveness. Also, because the precured resin is completely reacted, there is less interaction of the resin with carrier fluid. This lack of interaction makes the fluid more stable and results in more predictable performance.

The invention also provides improved methods of using the above-described curable and/or precured proppants for treating subterranean formations.

When the method employs a precured coating composition on the proppant, the proppant is put into the subterranean formation without a need for additional curing within the formation.

When the method employs a curable coating composition on the proppant, the method may further comprise curing the curable coating composition by exposing the coating composition to sufficient heat and pressure in the subterranean formation to cause crosslinking of the resins and consolidation of the proppant. In some cases an activator, as discussed above, can be used to facilitate consolidation of curable proppant. In another embodiment employing a curable coating composition on the proppant, the method further comprises low temperature acid catalyzed curing at temperatures as low as 70° F. An example of low temperature acid catalyzed curing is disclosed by U.S. Pat. No. 4,785,884 incorporated herein by reference in its entirety.

Also, resin coated particulate material, e.g., resin coated sands, may be used by filling a cylindrical structure with the resin coated particulate material, i.e., proppant, and inserted into the wellbore. Once in place, the improved properties of this invention are beneficial because the proppant will cure and act as a filter or screen to eliminate the backwards flow of sand, other proppants, or subterranean formation particles. This is a significant advantage to eliminate the backflow of particulates into above ground equipment.

DETAILED DESCRIPTION OF THE PREFERRED EMBODIMENTS

The fibers of the present invention may be employed with any resin-coated particulate proppant material. The type of resin, particulate material and fiber making up the proppant will depend upon a number of factors including the probable closure stress, formation temperature, and the type of formation fluid.

The term resin includes a broad class of high polymeric synthetic substances. Resin includes thermosetting and thermoplastic materials, but excludes rubber and other elastomers. Specific thermosets include epoxy, phenolic, e.g., resole (a true thermosetting resin) or novolac (thermoplastic resin which is rendered thermosetting by a hardening agent), polyester resin, and epoxy-modified novolac as disclosed by U.S. Pat. No. 4,923,714 to Gibb et al incorporated herein by reference. The phenolic resin comprises any of a phenolic novolac polymer; a phenolic resole polymer; a combination of a phenolic novolac polymer and a phenolic resole polymer; a cured combination of phenolic/furan resin or a furan resin to form a precured resin (as disclosed by U.S. Pat. No. 4,694,905 to Armbruster incorporated herein by reference); or a curable furan/phenolic resin system curable in the presence of a strong acid to form a curable resin (as disclosed by U.S. Pat. No. 4,785,884 to Armbruster). The phenolics of the above-mentioned novolac or resole polymers may be phenol moieties or bis-phenol moieties. Novolac resins are preferred. Specific thermoplastics include polyethylene, acrylonitrile-butadiene styrene, polystyrene, polyvinyl chloride, fluoroplastics, polysulfide, polypropylene, styrene acrylonitrile, nylon, and phenylene oxide. It is desired to use resin amounts of about 0.5 to about 8% based on substrate weight, preferably about 0.75 to about 4%.

A. Substrate

Particulate material, i.e., substrate, includes sand, naturally occurring mineral fibers, such as zircon and mullite, ceramic, such as sintered bauxite, or sintered alumina, other non-ceramic refractories such as milled or glass beads. The particulate substrate may be sand, ceramics, or other particulate substrate and has a particle size in the range of USA Standard Testing screen numbers from about 8 to about 100 (i.e. screen openings of about 0.0937 inch to about 0.0059 inch). Preferred substrate diameter is from about 0.01 to about 0.04 inches. Bauxite, unlike alumina, contains naturally occurring impurities and does not require the addition of sintering agents. The particles are typical proppant particles. Thus, they are hard and resist deforming. Deforming is different from crushing wherein the particle deteriorates.

B. Fibers

The fibers may be any of various kinds of commercially available short fibers. Such fibers include at least one member selected from the group consisting of milled glass fibers, milled ceramic fibers, milled carbon fibers, natural fibers, and synthetic fibers having a softening point above typical starting sand temperature for coating, e.g., at least about 200° F., so as to not degrade, soften or agglomerate.

The typical glasses for fibers include E-glass, S-glass, and AR-glass. E-glass is a commercially available grade of glass fibers typically-employed in electrical uses. S-glass is used for its strength. AR-glass is used for its alkali resistance. The carbon fibers are of graphitized carbon. The ceramic fibers are typically alumina, porcelain, or other vitreous material.

The fiber material should be inert to components in the subterranean formation, e.g., well treatment fluids, and be able to withstand the conditions, e.g., temperature and pressure, in the well. Fibers of different dimensions and/or materials may be employed together. Glass fibers and ceramic fibers are most preferred. Typically the fiber material density is about that of the substrate, but this is not necessary.

The fiber material is preferably abrasion resistant to withstand pneumatic conveying. It is important that the dimensions and amount of fibers, as well as the type and amount of resin coating, be selected so that the fibers are attached to the resin coating of the proppant rather than being loosely mixed with proppant particles. The attachment prevents loose particles from clogging parts, e.g., screens, of an oil or gas well. Moreover, the attachment prevents loose particles from decreasing permeability in the oil or gas well.

Resin coated curable proppants contain about 0.1% to about 15% fibers based on the substrate weight, preferably about 0.1% to about 5 weight percent fibers, more preferably about 0.1% to about 3 weight percent fibers.

Resin coated precurable proppants contain about 0.1 to about 15 weight percent fibers, based on substrate weight. To achieve enhanced permeability at low to moderate (less than about 4000 psi) closure stress levels, a fiber content of 0.25 to about 5 weight percent is typical. At fiber levels of about 5 to 15 weight percent the coating surface roughens. The roughened grains do not slide easily. Thus, this roughness diminishes flow-back. Also, to achieve enhanced flow-back resistance, by having fibers protrude from the coated fiber, a fiber content of about 10 to about 15 weight percent is preferred. The degree of roughness and/or fiber protrusion varies with parameters such as fiber loading levels, fiber length, resin loading levels, and substrate size and shape.

Fiber lengths range from about 6 microns to about 3200 microns (about 1/8 inch). Preferred fiber lengths range from about 10 microns to about 1600 microns. More preferred fiber lengths range from about 10 microns to about 800 microns. A typical fiber length range is about 0.001 to about 1/16 inch. Preferably, the fibers are shorter than the greatest length of the substrate. Suitable, commercially available fibers include milled glass fiber having lengths of 0.1 to about 1/32 inch; milled ceramic fibers 25 microns long; milled carbon fibers 250 to 350 microns long, and KEVLAR aramid fibers 12 microns long. Fiber diameter (or, for fibers of non-circular cross-section, a hypothetical dimension equal to the diameter of a hypothetical circle having an area equal to the cross-sectional area of the fiber) range from about 1 to about 20 microns. Length to aspect ratio (length to diameter ratio) may range from about 5 to about 175. The fiber may have a round, oval, square, rectangular or other appropriate cross-section. One source of the fibers of rectangular cross-section may be chopped sheet material. Such chopped sheet material would have a length and a rectangular cross-section. The rectangular cross-section has a pair of shorter sides and a pair of relatively longer sides. The ratio of lengths of the shorter side to the longer side is typically about 1:2–10. The fibers may be straight, crimped, curled or combinations thereof.

Typical resin coated proppants have about 0.1 to about 10 weight percent resin, preferably about 0.4 to about 6 weight percent resin, more preferably about 0.4 to about 5 weight percent resin, most preferably about 2.5 to about 5 weight percent resin. Potential hypothetical resin coated proppants include a conventional proppant substrate with any of the following resin levels and fibers. Resin levels of 0.75 to 3 weight percent, based on substrate weight, with 0.0001 to ⅟32 inch long milled glass fiber at levels as low as 0.1 to 0.25 weight percent, based on substrate weight may be employed. In particular, resin levels of 2.5 to 3 weight percent, based on substrate weight, with ⅟32 inch long milled glass fiber may be employed. Resin levels of about 0.75 to about 1 weight percent, based on substrate weight, with ⅟32 inch long milled glass fiber may be employed. Resin levels of 2.5 to 3.0 weight percent, based on substrate weight, with ceramic fibers having lengths from 20 to 25 microns may be employed. Resin levels of 1 to 1.5 weight percent, based on substrate weight, with ceramic fibers having lengths of 20 to 50 microns may be employed.

By employing fibers, the present invention achieves curable proppants having higher compressive strengths. These stronger fiber reinforced coated proppants will better withstand the closure stress of fracture and better resist flow-back. This will help in maintaining better conductivity and permeability of the proppant in the fracture for a longer time than conventional curable proppants employing the same resin in the absence of fibers.

The present invention also provides precured proppant with better resistance to flow-back. The resistance to flow-back is especially achieved where the fibers roughen the resin coating surface and/or protrude from the resin coating. The roughened surface and/or protruding fibers cause the coated proppant particles to resist moving past one another to prevent flow-back. An advantage of employing fiber-laden precured proppant, over curable coated proppant (which are fiber free) is that it works at any temperature. Curable resin coated sands only work where downhole temperatures are high enough to cure the resin. Fiber-laden precured proppants are also different from, and better than, proppant systems of physical loose mixtures of sand and fibers. Such physical mixtures may segregate and thus, achieve reduced effectiveness.

C. Phenol-Aldehyde Novolac Polymer-Containing Resins

An embodiment of the present invention is a resin coated particulate material wherein the resin includes phenol-aldehyde novolac polymer. The novolac may be any novolac employed with proppants. The novolac may be obtained by the reaction of a phenolic compound and an aldehyde in a strongly acidic pH region. Suitable acid catalysts include the strong mineral acids such as sulfuric acid, phosphoric acid and hydrochloric acid as well as organic acid catalysts such as oxalic, or para toluenesulfonic acid. An alternative way to make novolacs is to react a phenol and an aldehyde in the presence of divalent inorganic salts such as zinc acetate, zinc borate, manganese salts, cobalt salts, etc. The selection of catalyst may be important for directing the production of novolacs which have various ratios of ortho or para substitution by aldehyde on the phenolic ring, e.g., zinc acetate favors ortho substitution. Novolacs enriched in ortho substitution, i.e.. high-ortho novolacs, may be 15 preferred because of greater reactivity in further cross-linking for polymer development. High ortho novolacs are discussed by Knop and Pilato, *Phenolic Resins,* p. 50–51 (1985) (Springer-Verlag) incorporated herein by reference. High-ortho novolacs are defined as novolacs wherein at least 60% of the total of the resin ortho substitution and para substitution is ortho substitution, preferably at least about 70% of this total substitution is ortho substitution.

The novolac polymer typically comprises phenol and aldehyde in a molar ratio from about 1:0.85 to about 1:0.4. Any suitable aldehyde may be used for this purpose. The aldehyde may be formalin, paraformaldehyde, formaldehyde, acetaldehyde, furfural, benzaldehyde or other aldehyde sources. Formaldehyde itself is preferred.

The novolacs used in this invention are generally solids such as in the form of a flake, powder, etc. The molecular weight of the novolac will vary from about 500 to 10,000, preferably 1,000 to 5,000 depending on their intended use. The molecular weight of the novolacs in this description of the present invention are on a weight average molecular weight basis. High-ortho novolac resins are especially preferred.

The coating composition typically comprises at least 10 weight percent novolac polymer, preferably at least about 20 weight percent novolac polymer, most preferably about 50 to about 70 weight percent novolac polymer. The remainder of the coating composition could include crosslinking agents, modifiers or other appropriate ingredients.

The phenolic moiety of the novolac polymer is selected from phenols of Formula I or bisphenols of Formula II, respectively:

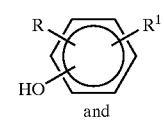

and

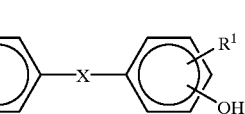

R and $R^1$ are independently alkyl, aryl, arylalkyl or H. In Formula II, R and $R^1$ are preferably meta to the respective hydroxy group on the respective aromatic ring. Unless otherwise defined, alkyl is defined as having 1 to 6 carbon atoms, and aryl is defined as having 6 carbon atoms in its ring. In Formula II, X is a direct bond, sulfonyl, alkylidene unsubstituted or substituted with halogen, cycloalkylidene, or halogenated cycloalkylidene. Alkylidene is a divalent organic radical of Formula III:

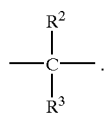

When X is alkylidene, $R^2$ and $R^3$ are selected independently from H, alkyl, aryl, arylalkyl, halogenated alkyl; halogenated aryl and halogenated arylalkyl. When X is halogenated alkylidene, one or more of the hydrogen atoms of the alkylidene moiety of Formula II are replaced by a halogen atom. Preferably the halogen is fluorine or chlorine. Also, halogenated cycloalkylidene is preferably substituted by fluorine or chlorine on the cycloalkylidene moiety.

A typical phenol of Formula I is phenol, per se.

Typical bisphenols of Formula II include Bisphenol A, Bisphenol C, Bisphenol E, Bisphenol F, Bisphenol S, or Bisphenol Z.

The present invention includes novolac polymers which contain any one of the phenols of Formula I, bisphenols of Formula II, or combinations of one or more of the phenols of Formula I and/or one or more of the bisphenols of Formula II. The novolac polymer may optionally be further modified by the addition of VINSOL®, epoxy resins, bisphenol, waxes, or other known resin additives. One mode of preparing an alkylphenol-modified phenol novolac polymer is to combine an alkylphenol and phenol at a molar ratio above 0.05:1. This combination is reacted with a source of formaldehyde under acidic catalysis, or divalent metal catalysis (e.g., Zn, Mn). During this reaction, the combination of alkylphenol and phenol is present in molar excess relative to the formaldehyde present. Under acidic conditions, the polymerization of the methylolated phenols is a faster reaction than the initial methylolation from the formaldehyde. Consequently, a polymer structure is built up consisting of phenolic and alkylphenolic nuclei, linked together by methylene bridges, and with essentially no free methylol groups. In the case of metal ion catalysis, the polymerization will lead to methylol and benzylic ethers, which subsequently break down to methylene bridges, and the final product is essentially free of methylol groups.

D. Crosslinking Agents and Other Additives

For practical purposes, phenolic novolacs do not harden upon heating, but remain soluble and fusible unless a hardener (crosslinking agent) is present. Thus, in curing a novolac resin, a crosslinking agent is used to overcome the deficiency of alkylene-bridging groups to convert the resin to an insoluble infusible condition.

Appropriate crosslinking agents include hexamethylenetetnine (HEXA), paraformaldehyde, oxazolidines, melamine resin or other aldehyde donors and/or phenol-aldehyde resole polymers. Each of these crosslinkers can be used by itself or in combinations with other crosslinkers. The resole polymer may contain substituted or unsubstituted phenol.

The coating composition of this invention typically comprises up to about 25 weight percent HEXA and/or up to about 90 weight percent resole polymers based on the total weight of coating composition. Where HEXA is the sole crosslinking agent, the HEXA comprises from about 5 to about 25 weight percent of the resin. Where the phenol-aldehyde resole polymer is the sole crosslinking agent, the resin contains from about 20 to about 90 weight percent of the resole polymer. The composition may also comprise combinations of these crosslinkers.

The phenol-aldehyde resole resin has a phenol:aldehyde molar ratio from about 1:1 to about 1:3. A preferred mode of preparing the resole resin is to combine phenol with a source of aldehyde such as formaldehyde, acetaldehyde, furfural, benzaldehyde or paraformaldehyde under alkaline catalysis. During such reaction, the aldehyde is present in molar excess. It is preferred that the resole resin have a molar ratio of phenol to formaldehyde from about 1:1.2 to 1:2.5. The resoles may be conventional resoles or modified resoles. Modified resoles are disclosed by U.S. Pat. No. 5,218,038, incorporated herein by reference in its entirety. Such modified resoles are prepared by reacting aldehyde with a blend of unsubstituted phenol and at least one phenolic material selected from the group consisting of arylphenol, alkylphenol, alkoxyphenol, and aryloxyphenol.

Modified resole resins include alkoxy modified resole resins. Of alkoxy modified resole resins, methoxy modified resole resins are preferred. However, the phenolic resole resin which is most preferred is the modified orthobenzylic ether-containing resole resin prepared by the reaction of a phenol and an aldehyde in the presence of an aliphatic hydroxy compound containing two or more hydroxy groups per molecule. In one preferred modification of the process, the reaction is also carried out in the presence of a monohydric alcohol.

Metal ion catalysts useful in production of the modified phenolic resole resins include salts of the divalent ions of Mn, Zn, Cd, Mg, Co, Ni, Fe, Pb, Ca and Ba. Tetra alkoxy titanium compounds of the formula Ti(OR)$_4$ where R is an alkyl group containing from 3 to 8 carbon atoms, are also useful catalysts for this reaction. A preferred catalyst is zinc acetate. These catalysts give phenolic resole resins wherein the preponderance of the bridges joining the phenolic nuclei are ortho-benzylic ether bridges of the general formula —CH$_2$(OCH$_2$)$_n$— where n is a small positive integer.

Additives are used for special cases for special requirements. The coating systems of the invention may include a wide variety of additive materials. The coating may also include one or more other additives such as a coupling agent such as a silane to promote adhesion of the coating to substrate, a silicone lubricant, a wetting agent, a surfactant, dyes, flow modifiers (such as flow control agents and flow enhancers), and/or anti-static agents. The surfactants may be anionic, nonionic, cationic, amphoteric or mixtures thereof Certain surfactants also operate as flow control agents. Other additives include humidity resistant additives or hot strength additives. Of course, the additives may be added in combination or singly.

E. Method to Make Novolac Polymer

To make phenolic novolac polymers with one or more phenols of Formula I, the phenol is mixed with acidic catalyst and heated. Then an aldehyde, such as a 50 weight % solution of formaldehyde is added to the hot phenol and catalyst at elevated temperature. Water made by the reaction is removed by distillation to result in molten novolac. The molten novolac is then cooled and flaked.

To make novolac polymers with bisphenols of Formula II, the bisphenol is mixed with a solvent, such as n-butyl acetate, at elevated temperature. An acid catalyst such as oxalic acid or methane sulfonic acid is then added and mixed with the bisphenol and then an aldehyde, typically formaldehyde, is added. The reactants are then refluxed. It is noted that the preparation of the novolac resin can occur under acidic catalysis, or divalent metal catalysis (e.g., Zn, Mn), wherein the bisphenol is present in greater than equimolar amount relative to the source of aldehyde. After reflux, water is collected by azeotropic distillation with n-butyl acetate. After removal of the water and n-butyl acetate, the resin is flaked to yield resin products. Alternatively, the polymers can be made using water as a solvent.

F. Manufactrring of Resoles

A typical way to make resoles is to put a phenol in a reactor, add an alkaline catalyst, such as sodium hydroxide or calcium hydroxide, and aldehyde, such as a 50 weight % solution of formaldehyde, and react the ingredients under elevated temperature until the desired viscosity or free formaldehyde is achieved. Water content is adjusted by distillation.

G. Reacting Aldehyde With Phenol-Aldehyde Novolacs or Bisphenol-Aldehyde Novolacs Phenol-aldehyde novolacs or bisphenol-aldehyde novolacs may be modified by reacting these novolacs with an additional quantity of aldehyde using a basic catalyst. Typical catalysts used are sodium hydroxide, potassium hydroxide, barium hydroxide, calcium hydroxide (or lime), ammonium hydroxide and amines.

In the case of phenol-aldehyde polymers or bisphenol-aldehyde polymers, the molar ratio of added aldehyde to phenolic moiety, based on the phenolic moiety monomeric units in the novolac, ranges from 0.4:1 to 3:1, preferably from 0.8:1 to 2:1. This achieves a crosslinkable (reactive) polymer having different chemical structures and generally higher molecular weights than the resole polymers obtained by a single step process which involves initially mixing bisphenol monomers and aldehyde with an alkaline catalyst at the same molar ratio of the combined aldehyde and bisphenol. Furthermore, it is feasible to use different aldehydes at different stages of the polymer preparation.

These aldehyde-modified polymers are useful in coating compositions for oil field proppants and foundry sands. These polymers can be used alone as a coating. These polymers can also be used with other polymers, such as phenol-aldehyde novolacs, bisphenol-aldehyde novolac, or combinations thereof, as a crosslinking agent, or as a component of crosslinking agents. When the aldehyde-modified polymers are employed as crosslinking agents, they may be used with other typical crosslinking agents such as those described above for novolac polymers.

H. Method to Make Proppant

After making the resin, the crosslinking agent, resin, fibers, and particulate material are mixed at conditions to provide either a precured or curable coating composition, as desired. Precured or curable proppants can be made by coating particulate material, e.g., sand, with the coating composition and fibers. Whether a coating composition is of the precured or curable type depends upon a number of parameters. Such parameters include the ratio of the novolac resin to the curing agent; the acidity of the novolac resin; the pH of the resole resin; the amount of the crosslinking agent; the time of mixing the coating compositions, fibers, and particles; the temperature of the coating compositions, fibers, and particles during mixing; catalysts (if any) used during the particle coating; and other process parameters as known to those skilled in the art. Typically, the precured or curable proppants may have a coating which contains resole resin in the presence or absence of novolac resin.

The coating resin may be admixed to particulate material combined with fibers. In an alternative method, the fibers (and optionally additional resin) are admixed to a resin coated particulate material. In another alternative method, the particulate material is admixed to fibers and resin.

Typically, the resin is coated onto particulate material and fibers by a hot coat process or a warm coat process. The hot coat process includes adding the resin to hot sand, or other particulate material, which has been heated to a temperature above the resin's melting point. Then a crosslinking agent is added and the ingredients are stirred for the desired time to produce a particulate material coated with either a precured or curable resin as desired. Typically, the mixing occurs in the presence of a coupling agent such as an organosilane and a lubricant, such as a silicone fluid, such as L-45 manufactured by Dow Corning Corporation, Midland, Mich. (materials of this type are discussed in U.S. Pat. No. 4,439,489 to Johnson, et al). The coated sand is then removed, cooled and sieved.

In the warm coat process, the resin is in a liquid form, e.g., solution, dispersion or suspension, preferably solution, when it is mixed with the particulate substrate, crosslinker or other appropriate ingredients. The carrier liquid, e.g., solvent, is then removed resulting in a free flowing proppant coated with curable resin.

FIG. 1A shows a proppant particle 10 comprising a substrate particle 20, a resin coating 15 and fibers 18. The resin, crosslinking agent, fibers 18 and particle 20 are mixed to produce the proppant 10. The proppant 10 is prepared to comprise from about 1 to about 8 weight percent coating 15 as well as an amount of fibers 18 as disclosed above. Also, the particle 20 has a pre-coated size in the range of USA Standard Testing screen numbers from about 8 to about 100. A portion of the fibers 18 may protrude a distance D. Roughness or protruding fibers may prevent flow-back of curable proppant prior to completion of the curing process. However, some of the fibers 18 may be totally embedded in the resin coating 15, e.g., fiber 24. Some fibers 22 may be curved. Moreover, some fibers 26 may curl sufficiently to hook both fiber ends into the coating 15.

Figure 1B:
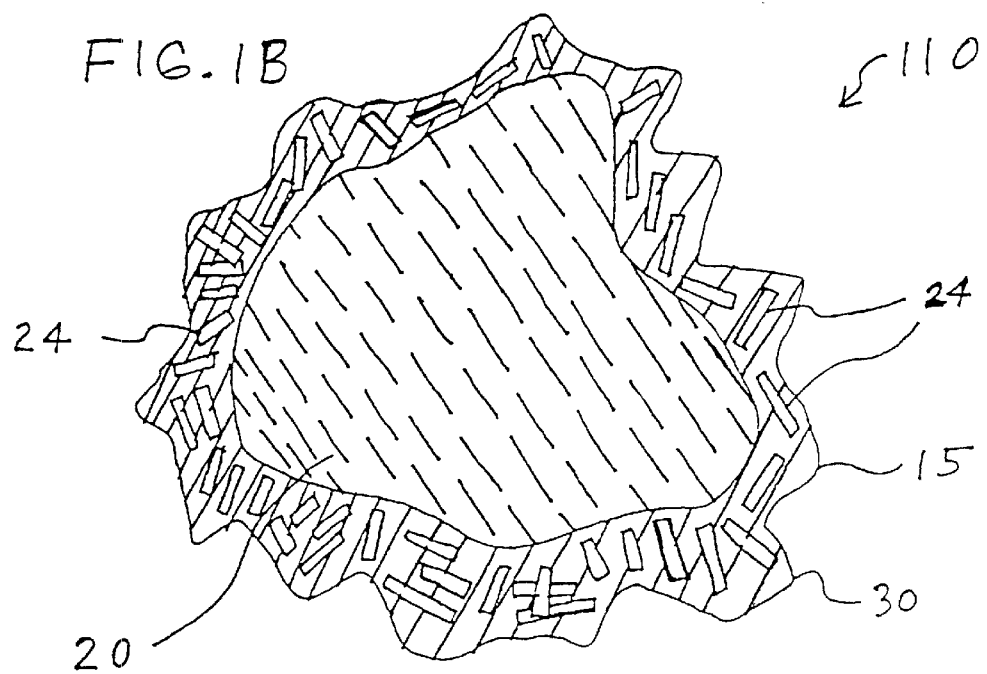
FIG. 1B shows a schematic drawing of a second embodiment of a resin coated particle of the present invention for use as a proppant.

FIG. 1B shows a coated proppant particle 110 wherein the fibers 24 are embedded in the resin coating 15 about the substrate particle 20, and the fibers 24 cause the proppant particle 110 to have a roughened surface 30.

The known hot coat or warm coat processes for making coated proppants may be modified by electrically charging the substrate and oppositely charging the fibers to encourage the fibers to orient orthogonal to the substrate and protrude from the coating.

The fibers provide the advantages of higher strength and reduced flow-back with curable resin-coated proppants. The protruding fibers improve the flow-back resistance of pre-cured resin-coated proppants because the fibers cause adjacent proppant particles to interlock. Also. the precured, fiber-laden proppants improve the permeability of subterranean formations at closure stresses of up to about 4000 psi.

The following parameters are useful when characterizing coated proppants of the present invention.

Compressive strength of curable proppants is defined as that measured according to the following procedure. A 2 weight percent KCl solution (doped with a small amount of detergent to enhance wetability) is added to proppant. The KCl solution and proppant are gently agitated to wet the proppant. Samples of the wet proppant will be cured at 1000 psi or at atmospheric pressure. For wet proppant samples to be cured at 1000 psi, the wet proppant is packed into steel tubes with a movable plunger. After packing the proppant, a load of 1,000 psi is applied using the plunger. For wet proppant samples to be cured at atmospheric pressure, the wet proppant is packed into a plastic tube. In either event, the samples are then heated to 200° F. and held at 200° F. for 24 hours to cure the samples. During the curing process, loose proppant particles become a consolidated mass. After 24 hours, the samples are removed as slugs. Both ends of each slug are smoothed to give flat surfaces and the slugs are cut to about two inches in length. The slugs have a nominal one inch diameter. Compressive strength tests of the slugs are determined using a tensile tester manufactured by Detroit Testing Machine Company and the results were reported. Typical compressive strengths of proppants of the present invention range from 50 to 3000 psi or higher.

Hot tensile strength of curable proppants is defined as that measured by heating a two part bracket mold until it reaches a temperature of 450° F. Uncured resin coated sand is blown into the hot mold and the sand is kept at this temperature for 3 minutes to cure. After completion of curing time, tensile measurement are made automatically with a built-in tensile tester. Typical hot tensile strengths of proppants of the present invention range from 0 to 500 psi or higher.

Crush resistance of precured proppants is defined as that measured according to the following procedure. American Petroleum Institute RP 60 procedure, Section 7 (1989).

Long term conductivity is defined as that measured by the "Proppant Consortium Baseline Procedure," developed by Stim-Lab, Inc., Duncan, Okla.

Melt point of curable resin coated sand is defined as that determined using a melt point bar. A melt point bar is a brass metal bar (18 inches long and 2 inches wide) with an electric heating element at one end. Therefore, a temperature gradient can be established across the length of the bar and the temperature across the bar is monitored with thermometers or thermocouples. Typically, the temperature is about 315 to about 330° F. at the hottest end of the bar. Using a funnel, a uniform strip of resin coated sand is laid on the heated bar and cured for 60 seconds. Then an air jet at 10 psi pressure is blown on the sand and any uncured sand will be blown off the bar. Melt point is the lowest temperature at which the resin coated sand forms a mass.

EXAMPLE 1

The following general coating procedures were followed to prepare fiber-laden curable proppants using HEXA as a crosslinking agent. Into a 3 quart mixing bowl was placed one kilogram of 20/40 mesh sand available from and an appropriate amount of fiber to achieve the desired weight percent fiber. 20/40 sand has 90% of its particles between 20 and 40 mesh (U.S. Standard Sieve Series) per American Petroleum Institute RP-60 procedure, Section 4 (1989). The sand and glass fiber were stirred with a Hobart C-100 mixer and heated with a gas flame to 280° F. 26.6 grams of EX5150 novolac resin (Borden, Inc.) and 0.4 grams of A-1100 silane (Union Carbide Corporation) were added and mixed for 90 seconds. At this time 13.8 grams of 32.6% water solution of hexamethylenetetramine was added. Mixing was continued and at 96 seconds of total mixing time 8.1 grams of water was added. At 120 seconds of mixing time 1.0 gram of L45 silicone was added. Mixing was continued for another 180 seconds. At 300 seconds of total mixing time the coated sand was discharged from the bowl as a free flowing product consisting of individual sand grains coated with a curable resin coating. The stick melting point of this product was 232° F. A 3 mninute, 450° F. hot tensile strength test was run and produced a specimen with a hot tensile of 200 psi. The proppant was coated with Plasti Flake EX5150, a commercial phenol-formaldehyde novolac manufactured by Borden, Inc./North American Resins, Louisville, Ky.

Comparative Example 1

The procedure generally such as that of Example 1 was repeated without fibers, with the same ingredients, except to make a conventional curable resin coated proppant.

Comparison of Curable Proppants of Example 1 and Comparative Example 1

The curable proppants of Example 1 and Comparative Example 1 were prepared with varying resin contents and added milled glass fibers, milled carbon fibers, milled ceramic fibers and KEVLAR aramid fibers at levels of 0%, ¼%, ½%, 2%, 5% and 10 weight % based on weight of 20/40 Brady sand. 20/40 Brady sand is available from Ogelby-Norton, Brady, Tex. These laboratory prepared samples were evaluated for resin contents, melting point, hot tensile strength, and compressive strength. Tables 1–6 summarize the results of these experiments. The proppants of Comparative Example 1 are listed as "Controls" on Tables 1–6. In the TABLES "Loss on Ignition" is defined as that measured after burning proppant at 1700° F. for two hours and represents the amount of resin on the proppant. Table 7 employs 20/40 Brady sand with resin and fibers.

TABLE 1

CURABLE RESIN WITH 1/16" MILLED GLASS FIBER[1] AND 20/40 BRADY SAND

| Sample Number | Control 1 | 1 | 2 | Control 2 | 3 | 4 | 5 | 6 | 7 | 8 | 9 |
|---|---|---|---|---|---|---|---|---|---|---|---|
| Loss on Ignition (wt %) | 1.8 | 1.89 | 2.61 | 2.89 | 2.90 | 2.89 | 2.92 | 2.72 | 2.47 | 2.96 | 3.02 |
| Melting Point (° F.) | 246 | 257 | 260 | 239 | 238 | 235 | 252 | >260 | >260 | 252 | 262 |
| Hot Tensile Strength (psi) | 150 | 44 | 68 | 200 | 270 | 242 | 122 | 65 | 3 | 146 | 76 |
| Compressive Strength at Atm. Pres./200° F./ 24 hrs (psi) | 388 | 135 | 127 | 747 | 518 | 470 | 482 | 119 | 5 | 497 | 181 |

TABLE 1-continued

CURABLE RESIN WITH 1/16" MILLED GLASS FIBER[1]
AND 20/40 BRADY SAND

| Sample Number | Control 1 | 1 | 2 | Control 2 | 3 | 4 | 5 | 6 | 7 | 8 | 9 |
|---|---|---|---|---|---|---|---|---|---|---|---|
| Compressive Strength at 1,000 psi/200° F./24 hrs (psi) | 675 | 384 | 561 | 946 | 1900 | 1895 | 975 | 455 | 68 | 978 | 830 |
| % Increase in Compressive Strength at 1000 psi/200° F./24 hrs | — | — | — | — | 100.8 | 100.3 | 3.1 | — | — | 3.4 | — |
| Fiber Load on Sand (%) | 0 | 2 | 5 | 0 | ¼ | ½ | 2 | 5 | 10 | 2 | 5 |

[1]Fibers are 1/16 inch long, 10 micron in diameter, made of E glass, and available as MICROGLASS milled fiber from Fibertec, Bridgewater, Massachusetts.

TABLE 2

CURABLE RESIN WITH 1/32" MILLED GLASS FIBER[2]
AND 20/40 BRADY SAND

| Sample Number | Control 3 | 10 | 11 | 12 |
|---|---|---|---|---|
| Loss on Ignition (wt %) | 1.8 | 1.78 | 1.69 | 1.53 |
| Melting Point (° F.) | 246 | >255 | No Stick | No Stick |
| Hot Tensile Strength (psi) | 150 | 34 | 0 | 0 |
| Compressive Strength at Atm. Pres./200° F./24 hrs (psi) | 388 | 142 | 0 | 0 |
| Compressive Strength at 1,000 psi/200° F./24 hrs | 675 | 401 | 0 | 0 |
| % Increase in Compressive Strength at 1000 psi/200° F./24 hrs | — | — | — | — |
| Fiber load on Sand (%) | 0 | 2 | 5 | 10 |

| Sample Number | Control 4 | 13 | 14 | 15 | 16 | 17 | 18 | 19 |
|---|---|---|---|---|---|---|---|---|
| Loss on Ignition (wt %) | 2.89 | 2.91 | 2.94 | 2.94 | 2.63 | 2.52 | 2.94 | 3.02 |
| Melting Point (° F.) | 239 | 232 | 233 | 239 | >235 | >255 | 242 | >260 |
| Hot Tensile Strength HT (psi) | 200 | 218 | 236 | 135 | 62 | 0 | 113 | 83 |
| Compressive Strength at Atm. Pres./200° F./24 hrs (psi) | 747 | 432 | 637 | 442 | 128 | 7 | 480 | 257 |
| Compressive Strength at 1000 psi/200° F./24 hrs (psi) | 946 | 1975 | 1900 | 1600 | 499 | 127 | 1250 | 1050 |
| % Increase in Compressive Strength at 1000 psi/200° F./24 hrs | — | 108.8 | 100.8 | 69.1 | — | — | 32.1 | 11.0 |
| Fiber load on Sand (%) | 0 | ¼ | ½ | 2 | 5 | 10 | 2 | 5 |

[2]Fibers are 1/32 inch long, 16 microns in diameter, made of E glass, and available as MICROGLASS milled fiber from Fibertec, Bridgewater, Massachusetts.

TABLE 3

CURABLE RESIN WITH 1/32" AND 1/16" MILLED GLASS FIBER AND 20/40 BRADY SAND

| | Control | With 1/32" Milled Glass Fiber[2] | | | 1/16" Milled Glass Fiber[1] | |
|---|---|---|---|---|---|---|
| Sample Number | 5 | 20 | 21 | 22 | 23 | 24 |
| Loss on Ignition (wt %) | 4.2 | 4.23 | 4.21 | 4.33 | 4.17 | 4.18 |
| Melting Point (° F.) | 230 | 234 | 244 | >260 | 240 | 240 |
| Hot Tensile Strength (psi) | 240 | 196 | 242 | 86 | 346 | 142 |
| Compressive Strength at Atm. Pres./200° F./24 hrs (psi) | 1000 | 1367 | 860 | 437 | 902 | 767 |
| Compressive Strength at 1000 psi/200° F./24 hrs (psi) | 2800 | 3000 | 2525 | 2225 | 2975 | 2875 |
| % Increase in Compressive Strength at 1000 psi/200° F./24 hrs | — | 7.1 | — | — | 6.3 | 2.7 |
| Fiber Load on Sand (%) | 0 | 2 | 5 | 10 | 2 | 5 |

[1]See Table 1
[2]See Table 2

TABLE 4

CURABLE RESIN WITH 20–25 MICRON MILLED CERAMIC FIBER[3] AND 20/40 BRADY SAND

| Sample Number | Control 6 | 25 | 26 | 27 | 28 | 29 | 30 |
|---|---|---|---|---|---|---|---|
| Loss on Ignition (wt %) | 2.89 | 2.89 | 2.84 | 3.03 | 3.09 | 2.97 | 2.94 |
| Melting Point (° F.) | 224 | 235 | 240 | 242 | >260 | 240 | 245 |
| Hot Tensile Strength (psi) | 200 | 165 | 232 | 182 | 93 | 170 | 112 |
| Compressive Strength at Atm. Pres./200° F./24 hrs (psi) | 747 | 860 | 843 | 603 | 293 | 467 | 288 |
| Compressive Strength at 1000 psi/200° F./24 hrs (psi) | 946 | 1467 | 1300 | 1575 | 1425 | 1625 | 1375 |
| % Increase in Compressive Strength at 1000 psi/200° F./24 hrs | — | 55.0 | 37.4 | 66.5 | 50.6 | 71.8 | 45.3 |
| Fiber Load on Sand (%) | 0 | 1/4 | 1/2 | 2 | 5 | 2 | 5 |

| Sample Number | 31 | 32 | 33 | 34 | 35 | 36 | Control 7 |
|---|---|---|---|---|---|---|---|
| Loss on Ignition (wt %) | 4.31 | 4.33 | 4.22 | 4.13 | 4.23 | 4.21 | 4.2 |
| Melting Point (° F.) | 220 | 220 | 232 | 255 | 240 | 240 | 230 |
| Hot Tensile Strength (psi) | 410 | 402 | 270 | 142 | 288 | 256 | 240 |
| Compressive Strength at Atm. Pres./200° F./24 hrs (psi) | 1133 | 1087 | 1113 | 863 | 1533 | 773 | 1000 |
| Compressive Strength at 1000 psi/200° F./24 hrs (psi) | 3100 | 2850 | 3725 | 3325 | 3350 | 3325 | 2800 |

TABLE 4-continued

CURABLE RESIN WITH 20–25 MICRON MILLED CERAMIC FIBER[3] AND 20/40 BRADY SAND

| | | | | | | |
|---|---|---|---|---|---|---|
| % Increase in Compressive Strength at 1000 psi/200° F./24 hrs | 9.7 | 1.8 | 33.0 | 18.8 | 19.6 | 18.8 | — |
| Fiber load on Sand (%) | 1/4 | 1/2 | 2 | 5 | 2 | 5 | 0 |

[3]Fibers are alumina ceramic, 20–25 microns long, 2–3 microns in diameter, and available as FIBERFRAX from Carborundum Corp., Niagra Falls, New York.

TABLE 5

CURABLE RESIN WITH KEVLAR PULP FIBER[4] AND 20/40 BRADY SAND

| Sample Number | 37 | 38 | Control 8 |
|---|---|---|---|
| Loss of Ignition (wt %) | 3.55 | 3.51 | 2.89 |
| Melting Point (° F.) | 250 | >260 | 224 |
| Hot Tensile Strength (psi) | 125 | 0 | 200 |
| Compressive Strength at Atm. Pres./200° F./24 hrs (psi) | 468 | 0 | 747 |
| Compressive Strength at 1000 psi/200° F./24 hrs (psi) | 1725 | 137 | 946 |
| % Increase in Compressive Strength at 1000 psi/200° F./24 hrs | 82.3 | — | — |
| Fiber Load on Sand (%) | 1/2 | 2 | 0 |

[4]Fibers have a length of 12 microns, a diameter of 2 microns, are made of aramid fiber, and manufactured by E. I. duPont de Nemours & Co., Wilmington, Delaware.

TABLE 6

CURABLE RESIN WITH 250 MICRON MILLED CARBON FIBER[5] AND 20/40 BRADY SAND

| Sample Number | Control 9 | 39 | 40 | 41 | 42 | Control 10 |
|---|---|---|---|---|---|---|
| Loss on Ignition (wt %) | 2.89 | 5.98 | 4.52 | 5.63 | 6.77 | 4.2 |
| Melting Point (° F.) | 239 | >255 | >260 | 254 | >260 | 230 |
| Hot Tensile Strength (psi) | 200 | 55 | 0 | 205 | 46 | 240 |
| Compressive Strength at Atm. Pres./200° F./24 hrs (psi) | 747 | 310 | 10.3 | 1013 | 57 | 1000 |
| Compressive Strength at 1000 psi/200° F./24 hrs (psi) | 946 | 795 | 58 | 2625 | 235 | 2800 |
| Fiber Load on Sand (%) | 0 | 2 | 5 | 2 | 5 | 0 |

[5]Fibers are made of graphitized carbon, have a length of 250 microns, a diameter of about 7 microns, and are FORTAFIL fibers, manufactured by Fortafil Fibers, Inc., Rockwood, Tennessee.

TABLE 7

CURABLE RESIN WITH FIBER AND 20/40 HICKORY SAND
% FIBER LOAD ON SAND VS COMPRESSIVE STRENGTH

| Sample Number | % Fiber Load On Sand | A 1/16" Milled Glass Fiber Compressive Strength (1000 psi/ 200° F./ 24 hrs) | B 1/32" Milled Glass Fiber Compressive Strength (1000 psi/ 200° F./ 24 hrs) | C 20–25 Micron Milled Ceramic Fiber Compressive Strength (1000 psi/ 200° F./ 24 hrs) |
|---|---|---|---|---|
| Control 11 A,B,C | 0 | 946 | 946 | 946 |
| 43 A,B,C | 0.10 | 1078 | 963 | 1080 |
| 44 A,B,C | 0.125 | 1200 | 1150 | 1160 |
| 45 A,B,C | 0.25 | 1900 | 1975 | 1467 |
| 46 A,B,C | 0.50 | 1895 | 1900 | 1300 |
| 47 A,B,C | 2.00 | 975 | 1600 | 1575 |
| 48 A,B,C | 5.00 | 455 | 499 | 1425 |
| 49 A,B,C | 10.00 | 68 | 127 | 1120 |

NOTE: Fiber Specifications

| Milled Glass Fiber | | Milled Ceramic Fiber | |
|---|---|---|---|
| Fiber Length (Inch) | Fiber Diameter (Micron) | Fiber Length (Micron) | Fiber Diameter (Micron) |
| 1/16 (Avg.) | 10 (Avg.) | 20–25 (Avg.) | 2–3 (Avg.) |
| 1/32 (Avg.) | 16 (Avg.) | | |

To facilitate comparison of data, Table 7 repeats some of the data of Tables 1, 2 and 4 and includes additional data. The average L.O.I. of the samples of Table 7 is about 2.9.

Among all the samples whose results are listed on Tables 1–7, those curable (CR) samples containing milled glass fibers and milled ceramic fibers produced higher compressive strength than those of a control when tested after curing under 1,000 psi at 200° F. for 24 hrs. Moreover, test results demonstrated good reinforcement capabilities of milled glass fibers and milled ceramic fibers. When tested after curing for 24 hours at 1,000 psi and 200° F., compressive strengths up to 1900 psi with 1/4% glass fiber loading and 1,600 psi with 2% ceramic fibers loading (based on sand) were obtained (Tables 1, 2 and 4). This translates as an increase in compressive strength of 100% and 69% respectively. The fiber loading level for curable products with loss on ignition (L.O.I.) levels of about 3 appears to be desirable in the range of 1/4 to 2% based on sand for milled glass fibers and 1/4% to 5% for milled ceramic fibers (Tables 1, 2 and 4). At L.O.I. levels of about 4%, the 2% and 5% levels of milled ceramic fibers indicated significant increases in compressive strength when tested after curing at 1,000 psi and 200° F. for 24 hrs (Table 4).

Attempts to add KEVLAR aramid fibers in the mix were not totally successful due to the difficulty of dispersion. Due to the tangled nature of the fibers, fiber separation and its full uniform distribution in the mix were not achieved using our mixing and blending technique. Coated samples prepared with KEVLAR fibers when sieved produced many free fibers. Microscopic examination indicated that some of the fibers had been incorporated into the coating.

Data in Table 7 indicates glass fiber levels of 0.1 to about 2, and ceramic fiber levels of 0.1 to 10, are desirable to increase compressive strength.

EXAMPLE 2

Preparation of Precured Resin/Fiber Coated Proppant

In a 3 quart mixing bowl, 1 kilogram of 20/40 mesh sand and an appropriate amount of fiber to achieve the weight percents of fiber listed in the following Tables were added. The sand was stirred with a Hobart C-100 mixer and heated to 360° F. 41.8 grams of EX9100 resole resin (Borden, Inc., North American Resins) was added and mixed for 30 seconds. 0.4 grams of A-1100 silane (Union Carbide Corporation) was added. Mixing was continued and at 50 seconds of mixing time the stirrer was shifted to high speed. At 100 seconds, 0.3 grams of betaine nonionic surfactant, cocamidopropyl hydroxysultaine, was added. At 150 seconds the mixer was shifted to initial low speed. At 360 seconds mixing time the coated sand was discharged from the bowl as a free flowing product. The product was post baked for 14 minutes in an oven at 360° F. Then the coated fiber-laden sand was cooled and sieved through an 18 mesh screen to eliminate agglomerates.

Comparative Example 2

A procedure generally such as that of Example 2 was performed without fibers, to make a conventional precured resin coated proppant.

Comparison of Precured Proppants of Example 2 and Comparative Example 2

A number of samples were prepared for Example 2 and Comparative Example 2 at fiber loads of 0.25, 0.5, 2, 5 and 10% based on sand weight. These samples were then measured for Loss on Ignition and crush resistance and the results listed on Tables 7–10. The sample numbers for Comparative Example 2 are listed as "Controls" on Tables 8–11.

TABLE 8

PRECURED RESINS[6] WITH MILLED GLASS FIBER AND 20/40 BRADY SAND

| Sample | Control | With 1/32: Milled Glass Fiber[2] | | | | | With 1/16" Milled Glass Fiber[1] | | | | |
|---|---|---|---|---|---|---|---|---|---|---|---|
| Number | 12 | 50 | 51 | 52 | 53 | 54 | 55 | 56 | 57 | 58 | 59 |
| Loss on Ignition (wt %) | 2.48 | 2.6 | 2.78 | 2.42 | 2.53 | 2.34 | 2.66 | 2.68 | 2.58 | 2.48 | 2.33 |

TABLE 8-continued

PRECURED RESINS[6] WITH MILLED GLASS FIBER AND 20/40 BRADY SAND

| | With 1/32: Milled Glass Fiber[2] | | | | | | With 1/16" Milled Glass Fiber[1] | | | | |
|---|---|---|---|---|---|---|---|---|---|---|---|
| Sample | Control | | | | | | | | | | |
| Number | 12 | 50 | 51 | 52 | 53 | 54 | 55 | 56 | 57 | 58 | 59 |
| Crush Resistance at 10,000 psi (%) | 11.38 | 17.2 | 14.94 | 13.13 | 9.75 | 11.19 | 15.47 | 15.34 | 13.17 | 9.83 | 12.92 |
| Fiber Load On Sand | 0 | 1/4 | 1/2 | 2 | 5 | 10 | 1/4 | 1/2 | 2 | 5 | 10 |

[6]Resin is Oil Well Resole 9100.
[1]See Table 1.
[2]See Table 2.

TABLE 9

PRECURED RESIN[7] WITH MILLED GLASS FIBER AND 20/40 BRADY SAND

| | Control | With 1/32" Milled Glass Fiber[2] | | With 1/16" Milled Glass Fiber[1] | |
|---|---|---|---|---|---|
| Sample Number | 13 | 60 | 61 | 62 | 63 |
| Loss on Ignition (wt %) | 3.78 | 3.68 | 3.64 | 3.75 | 3.81 |
| Crush Resistance at 10,000 psi (%) | 3.92 | 5.42 | 5.17 | 6.3 | 4.2 |
| Fiber Load on Sand (%) | 0 | 2 | 5 | 2 | 5 |

[7]Resin is Oil Well Resole 9100.
[1]See Table 1.
[2]See Table 2.

TABLE 10

PRECURED RESIN WITH 20 MICRON MILLED CERAMIC FIBER[3] AND 20/40 BRADY SAND

| | Curable Resin[6] | | | | | Curable Resin[7] | | | | |
|---|---|---|---|---|---|---|---|---|---|---|
| Sample Number | Control 14 | 64 | 65 | 66 | 67 | Control 15 | 68 | 69 | 70 | 71 |
| Loss on Ignition (wt %) | 2.48 | 2.60 | 2.63 | 2.72 | 2.81 | 3.78 | 3.77 | 3.77 | 3.98 | 3.93 |
| Crush Resistance at 10,000 psi (%) | 11.38 | 12.5 | 13.7 | 14.33 | 15.2 | 3.92 | 6.4 | 8.5 | 9.46 | 8.53 |
| Fiber Load on Sand (%) | 0 | 2 | 5 | 1/2 | 1/2 | 0 | 2 | 5 | 1/2 | 1/4 |

[3]See Table 4, however, only 20 micron length fibers employed.
[6]See Table 7.
[7]See Table 8.

TABLE 11

PRECURED RESIN WITH 250 MICRON MILLED CARBON FIBER[5] AND 20/40 BRADY SAND

| | Precured Resin[6] | | | | Precured Resin[7] | | |
|---|---|---|---|---|---|---|---|
| Sample Number | Control 16 | 72 | 73 | 74 | Control 17 | 75 | 76 |
| Loss on Ignition (wt %) | 2.48 | 3.16 | 5.57 | 5.1 | 3.78 | 4.95 | 5.09 |
| Crush Resistance at 10,000 psi (%) | 11.38 | 9.33 | 18.2 | 18.2 | 3.92 | 6.5 | 12.9 |
| Fiber Load on Sand (%) | 0 | 2 | 5 | 10 | 0 | 2 | 5 |

[5]See Table 6.
[6]See Table 7.
[7]See Table 8.

The data in Tables 8–10 indicates the fibers do not harm crush resistance.

EXAMPLE 3

Precured proppants with fibers according to the description of Example 2 were prepared. Table 12 lists the precured samples of this example. The ingredients of the same size and material are the same as in Example 2 unless otherwise indicated. Varying amounts of different kinds of fiber were prepared to get products with roughened surfaces and/or protruding fibers. Observation of these samples under the microscope indicate that for milled glass fiber, the fibers start to protrude at the fiber level of 13 to 15%. Considerable amounts of loose fibers were observed in the carbon filled samples at fiber levels of 14% and above. Protruding fibers were not observed for milled ceramic fiber filled samples because of the very small ceramic fiber size. However, the 14% milled ceramic fiber sample appeared to have a very rough surface.

TABLE 12

| Sample Number | % Fiber Loading On Sand | Fiber | Fiber Length | Fiber Diameter (Micron) | Sample L.O.I. | Observation |
|---|---|---|---|---|---|---|
| 77 | 2 | Milled Glass | 1/16" | 10 | ~4% | No fiber detected on the sand surface. |
| 78 | 5 | Milled Glass | 1/16" | 10 | ~4% | Very few fibers appeared on the sand surface. |
| 79 | 6.5 | Milled Glass | 1/16" | 10 | ~4% | Few fibers observed on the sand surface. |
| 80 | 10 | Milled Glass | 1/16" | 10 | ~4% | Some fibers appeared on the sand surface. |
| 81 | 12 | Milled Glass | 1/16" | 10 | ~4% | Some fibers appeared on the sand surface. |
| 82 | 13 | Milled Glass | 1/16" | 10 | ~4% | Whisker-like product with some free fibers obtained. |
| 83 | 14 | Milled Glass | 1/16" | 10 | ~4% | Whisker-like product with some free fibers obtained. |
| 84 | 15 | Milled Glass | 1/16" | 10 | ~4% | Whisker-like product with a lot of free fibers obtained. |
| 85 | 1/4 | Milled Glass | 1/16" | 10 | ~2.5% | No fiber observed on the sand surface. |
| 86 | 1/2 | Milled Glass | 1/16" | 10 | ~2.5% | No fiber observed on the sand surface. |
| 87 | 2 | Milled Glass | 1/16" | 10 | ~2.5% | No fiber observed on the sand surface. |
| 88 | 2 | Milled Glass | 1/16" | 10 | ~2.5% | No fiber observed on the sand surface. |
| 89 | 2 | Milled Glass | 1/16" | 10 | ~2.5% | No fiber observed on the sand surface. |
| 90 | 5 | Milled Glass | 1/16" | 10 | ~2.5% | Few fibers observed on the sand surface. |
| 91 | 10 | Milled Glass | 1/16" | 10 | ~2.5% | Some fibers observed together with some free fibers. |
| 92 | 1/4 | Milled Ceramic | 10–15 Micron | 2–3 Micron | ~4% | No fiber observed on the sand surface. |
| 93 | 1/2 | Milled Ceramic | 10–15 Micron | 2–3 Micron | ~4% | No fiber observed on the sand surface. |
| 94 | 2 | Milled Ceramic | 10–15 Micron | 2–3 Micron | ~4% | No fiber observed on the sand surface. |
| 95 | 5 | Milled Ceramic | 10–15 Micron | 2–3 Micron | ~4% | No fiber observed on the sand surface. |
| 96 | 14 | Milled Ceramic | 10–15 Micron | 2–3 Micron | ~4% | No fiber observed but coated sand surface appeared rough. |
| 97 | 1/2 | Milled Ceramic | 10–15 Micron | 2–3 Micron | ~4% | No fiber observed on the sand surface. |
| 98 | 1/2 | Milled Ceramic | 20–25 Micron" | 2–3" | ~2.5" | No fiber observed on the sand surface. |
| 99 | 2 | Milled Ceramic | 20–25 Micron" | 2–3" | ~2.5" | No fiber observed on the sand surface. |
| 100 | 5 | Milled Ceramic | 20–25 Micron" | 2–3" | ~2.5" | No fiber observed, but coated sand surface appeared rough. |
| 101 | 2 | Milled Carbon | 250 Micron | 7.3 Micron | ~2.5 | Some fibers observed on the sand surface. |
| 102 | 5 | Milled Carbon | 250 Micron | 7.3 Micron | ~2.5 | Lot of fibers observed on the sand surface. |
| 103 | 10 | Milled Carbon | 250 Micron | 7.3 Micron | ~2.5 | Whisker-like product with some free fibers obtained. |
| 104 | 2 | Milled Carbon | 250 Micron | 7.3 Micron | ~4% | Some fiber observed on the sand surface. |
| 105 | 5 | Milled Carbon | 250 Micron | 7.3 Micron | ~4% | Lot of fibers appeared on the sand surface. Some free fibers were also present. |

EXAMPLE 4

A series of samples of fiber-laden curable and precured proppants was tested for 20/40 resin coated sand, at 250° F. (121° C.), for a flow rate of 2 lb$_m$ per ft$^2$, between Ohio Sandstone with 2% KCl. The samples employed resin and fibers coated on 20/40 Brady sand. Sample 106 (Table 13) was curable proppant which employed EX-5150 resin, ¼% by weight of substrate 1/32 inch long milled glass fibers (as in Table 2), and had a loss on ignition (LOI) of 2.91%. Sample 107 (Table 14) was a curable proppant which employed EX-5150 resin, 2% by weight of substrate 25 microns long ceramic fibers, and had a LOI of 2.97%. Sample 108 (Table 15) was a precured proppant which employed OFR-9100 resin manufactured by Borden, Inc./ North American Resins, Louisville, Ky., 2% by weight of substrate 1/32 inch long milled glass fibers, and had a LOI of 2.42%. Control Sample 18 (Table 16) employed ACFRAC PR 4000 precured proppant, manufactured by Borden, Inc., North American Resins, Louisville, Ky., and had a LOI of 2.32%. Ingredients of this Example having the same composition and size as in Examples 1–3 are the same unless otherwise indicated.

Figure 2:
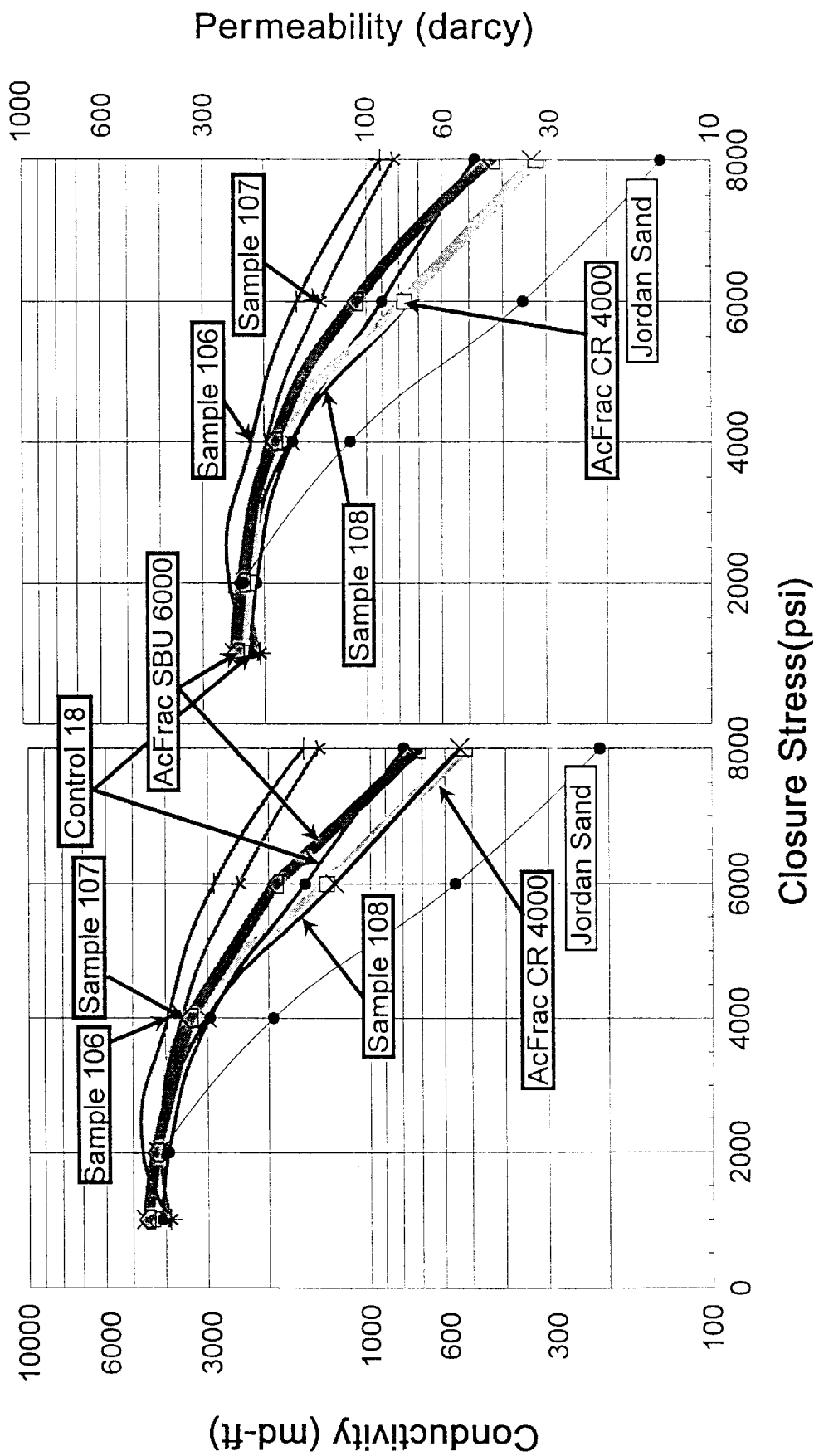
FIG. 2 shows plots of long term conductivity and permeability.

As shown by FIG. 2, both fiber filled curable proppants (Samples 106 and 107) performed significantly better than the curable control samples: ACFRAC CR 4000 and ACFRAC SB Ultra 6000. ACFRAC CR 4000 is a proppant of API high quality sand with a thermosetting filly curable phenolic/aldehyde resin with a LOI of about 2–2.6%. ACFRAC SB Ultra 6000 is a proppant of API high quality sand with a thermosetting partially-cured phenolic/aldehyde resin with a LOI of about 2.4–2.8. The resin of ACFRAC SB Ultra 6000 completes its curing during use.

As shown by Tables 15 and 16, fiber filled precured proppant (Sample 108) performed better than ACFRAC PR 4000 at stresses up to 4000 psi and performs about the same as ACFRAC PR 4000 at higher stresses.

TABLE 13

Conductivity and Permeability of
2 lb/sq ft of 20/40 Sample 106 - (Curable Resin Coated Sand)
Between Ohio Sandstone with 2% KCl Temperature 250° F., 2 ml/min.

| Hours at Closure and Temperature | Closure (psi) | Conductivity (md-ft) | Width (in) | Permeability (Darcies) |
|---|---|---|---|---|
| 0  | 2000 | 4001 | 0.224 | 214 |
| 50 | 2000 | 4686 | 0.223 | 252 |
| 0  | 4000 | 4340 | 0.221 | 236 |
| 50 | 4000 | 3938 | 0.217 | 218 |
| 0  | 6000 | 3588 | 0.216 | 199 |
| 50 | 6000 | 2872 | 0.215 | 160 |
| 0  | 8000 | 2508 | 0.213 | 141 |
| 50 | 8000 | 1570 | 0.207 | 91  |

TABLE 14

Conductivity and Permeability of
2 lb/sq ft of 20/40 Sample 107 - (Curable Resin Coated Sand)
Between Ohio Sandstone with 2% KCl Temperature 250° F., 2 ml/min.

| Hours at Closure and Temperature | Closure (psi) | Conductivity (md-ft) | Width (in) | Permeability (Darcies) |
|---|---|---|---|---|
| 0  | 2000 | 4260 | 0.223 | 229 |
| 50 | 2000 | 4128 | 0.222 | 223 |
| 0  | 4000 | 3737 | 0.219 | 205 |

TABLE 14-continued

Conductivity and Permeability of
2 lb/sq ft of 20/40 Sample 107 - (Curable Resin Coated Sand)
Between Ohio Sandstone with 2% KCl Temperature 250° F., 2 ml/min.

| Hours at Closure and Temperature | Closure (psi) | Conductivity (md-ft) | Width (in) | Permeability (Darcies) |
|---|---|---|---|---|
| 50 | 4000 | 3575 | 0.218 | 197 |
| 0  | 6000 | 2899 | 0.216 | 161 |
| 50 | 6000 | 2432 | 0.213 | 137 |
| 0  | 8000 | 2105 | 0.212 | 119 |
| 50 | 8000 | 1423 | 0.206 | 83  |

TABLE 15

Conductivity and Permeability of
2 lb/sq ft of 20/40 Sample 108 - (Precured Resin Coated Sand)
Between Ohio Sandstone with 2% KCl Temperature 250° F., 2 ml/min.

| Hours at Closure and Temperature | Closure (psi) | Conductivity (md-ft) | Width (in) | Permeability (Darcies) |
|---|---|---|---|---|
| 0  | 2000 | 4472 | 0.224 | 240 |
| 50 | 2000 | 4215 | 0.223 | 227 |
| 0  | 4000 | 3353 | 0.220 | 183 |
| 50 | 4000 | 3014 | 0.217 | 167 |
| 0  | 6000 | 1792 | 0.210 | 102 |
| 50 | 6000 | 1275 | 0.207 | 74  |
| 0  | 8000 | 849  | 0.205 | 50  |
| 50 | 8000 | 542  | 0.198 | 33  |

TABLE 16

Conductivity and Permeability of
2 lb/sq ft of 20/40 Sample Control 18 - (Precured Resin Coated Sand)
Between Ohio Sandstone with 2% KCl Temperature 250° F., 2 ml/min.

| Hours at Closure and Temperature | Closure (psi) | Conductivity (md-ft) | Width (in) | Permeability (Darcies) |
|---|---|---|---|---|
| 0  | 2000 | 4082 | 0.224 | 219 |
| 50 | 2000 | 3918 | 0.223 | 211 |
| 0  | 4000 | 3359 | 0.219 | 184 |
| 50 | 4000 | 2954 | 0.215 | 165 |
| 0  | 6000 | 2002 | 0.211 | 114 |
| 50 | 6000 | 1558 | 0.208 | 90  |
| 0  | 8000 | 1129 | 0.203 | 67  |
| 50 | 8000 | 791  | 0.199 | 48  |

EXAMPLE 5

Precured proppants with fibers prepared according to the description of Example 2 were tested for angle of repose against precured proppants prepared without fibers as in Comparative Example 2. Table 17 shows the results of these tests. Samples made according to Comparative Example 2 are listed as "Controls" on Table 17.

TABLE 17

Measurement Of The Lubricity Characteristics Of Fiber Reinforced Precured Proppants Made of 20/40 Brady Sand, Precured Resin[8] And Milled Glass Fiber

| Sample | Milled Glass Fiber[1] Fiber Length (inch) | % Fiber Added (On Sand) | Avg. Diameter of the Traced Circle (cm) | Static Angle of Repose 0° |
|---|---|---|---|---|
| 109 | 1/16 | 15 | 10.85 | 30.6 |
| 110 | 1/16 | 14 | 10.05 | 32.7 |
| 111 | 1/16 | 13 | 10.60 | 31.2 |
| 112 | 1/16 | 12 | 11.15 | 29.9 |
| Control 19 | — | 0 | 11.60 | 28.8 |
| PR 6000 | — | — | 11.9 | 28.2 |

[1]See Table 1
[8]See Example 2

The results of these tests show the fiber laden proppants have a slightly higher angle of repose. This implies the particles of proppants hold together better when they include fibers. Thus, the fiber laden proppant should have reduced flow-back relative to the non-fiber-containing proppant.

While specific embodiments of the composition and method aspects of the invention have been shown and described, it should be apparent that many modifications can be made thereto without departing from the spirit and scope of the invention. Accordingly, the invention is not limited by the foregoing description, but is only limited by the scope of the claims appended thereto.

What is claimed is:

1. A proppant particle comprising:
   a particulate substrate; and
   a coating comprising resin and fibrous material, wherein the fibrous material is embedded in the coating to be dispersed throughout the coating.

2. The proppant particle of claim 1, wherein the particulate substrate is selected from the group consisting of sand particles, naturally occuring mineral fibers, ceramic particles, glass beads and mixtures thereof.

3. The proppant particle of claim 1, wherein the particulate substrate has a particle size in the range of USA Standard Testing screen numbers from about 8 to about 100.

4. The proppant particle of claim 1, wherein the fibrous material is selected from the group consisting of milled glass fibers, milled ceramic fibers, milled carbon fibers, natural fibers and synthetic fibers having a softening point of at least about 200° F.

5. The proppant particle of claim 1, wherein the coating comprises about 0.1 to about 15% fibrous material based on particulate substrate weight.

6. The proppant particle of claim 1, wherein the coating comprises about 0.1 to about 3% fibrous material based on particulate substrate weight.

7. The proppant particle of claim 1, wherein the fibrous material has length from about 6 microns to about 3200 microns and a length to aspect ratio from about 5 to about 175.

8. The proppant particle of claim 7, wherein the fibrous material has a round, oval, or rectangular cross-section transverse to the longitudinal axis of the fibrous material.

9. The proppant particle of claim 1, wherein the resin is present in an amount of about 0.1 to about 10 weight percent based on substrate weight.

10. The proppant particle of claim 1, wherein the resin is present in an amount of about 0.4 to about 6 weight percent based on substrate weight.

11. The proppant particle of claim 1, wherein the resin comprises a member selected from the group consisting of a novolac polymer, a resole polymer and mixtures thereof.

12. The proppant particle of claim 11, wherein the coating comprises a high ortho resin, hexamethylenetetramine, a silane adhesion promoter, a silicone lubricant, a wetting agent and a surfactant.

13. The proppant particle of claim 1, wherein the resin comprises a member of the group consisting of a phenolic/furan resin, a furan resin, and mixtures thereof.

14. The proppant particle of claim 1, wherein the resin comprises a bisphenolic-aldehyde novolac polymer.

15. The proppant particle of claim 1, wherein the resin comprises a cured resin.

16. The proppant particle of claim 1, wherein the resin comprises a curable resin.

17. The proppant particle of claim 1, wherein the fibrous material is dispersed within the resin.

18. The proppant particle of claim 1, wherein the fibrous material is completely within the resin.

19. The proppant particle of claim 1, wherein the fibrous material is partially embedded in the resin so as to extend from the resin.

20. A method of treating a hydraulically induced fracture in a subterranean formation surrounding a wellbore comprising introducing into the fracture proppant particles of claim 1.

21. The method of treating of claim 20, wherein the particulate substrate is selected from the group consisting of sand, ceramic particles, glass beads and mixtures thereof.

22. The method of treating of claim 20, wherein the particulate substrate has a particle size in the range of USA Standard Testing screen numbers from about 8 to about 100.

23. The method of treating of claim 20, wherein the fibrous material is selected from the group consisting of milled glass fibers, milled ceramic fibers, milled carbon fibers, natural fibers and synthetic fibers having a softening point of at least about 200° F.

24. The method of treating of claim 20, wherein the coating comprises about 0.1 to about 15% fibrous material based on particulate substrate weight.

25. The method of treating of claim 20, wherein the fibrous material has a length from about 6 microns to about 3200 microns and a length to aspect ratio from about 5 to about 175.

26. The method of treating of claim 20, wherein the resin is present in an amount of about 0.1 to about 10 weight percent based on substrate weight.

27. The method of treating of claim 20, wherein the resin comprises a member selected from the group consisting of a novolac polymer, a resole polymer and mixtures thereof.

28. The method of treating of claim 20, wherein the resin comprises a bisphenolic-aldehyde novolac polymer.

29. The method of treating of claim 20, wherein the fibrous material is dispersed within the resin.

30. The method of treating of claim 20, wherein the fibrous material is completely within the resin.

31. The method of treating of claim 20, wherein the fibrous material is partially embedded in the resin so as to extend from the resin.

32. A method of treating a subterranean formation having a wellbore to prevent particulates from the subterranean formation from flowing back into surface equipment comprising introducing into the wellbore particles of claim 1, comprising a particulate substrate and a coating, the coating comprising resin and fibrous material.

33. The proppant particle of claim 1, wherein the particle has an angle of repose of 29.9° to 33°.

34. The proppant particle of claim 1, wherein the particle has an angle of repose of 29.9° to 32.7°.

35. The proppant particle of claim 1, wherein the particle consists essentially of the particulate substrate and the coating comprising resin and fibrous material, the coating being on the outer surface of the substrate.

36. The proppant particle of claim 1, wherein the coating is on the outer surface of the substrate.

37. The proppant particle of claim 1, wherein the fibrous material is embedded in the coating.

38. The proppant particle of claim 1, wherein the fibrous material is embedded dispersed throughout the coating.

39. A proppant particle comprising:

a particulate substrate, and a coating comprising resin and fibrous material, wherein the coating consists essentially of a single layer.

40. The proppant particle of claim 1, wherein the proppant comprises at most one coating and said coating consists essentially of a single layer.

41. A method of making a proppant particle of claim 1 comprising the steps of:

providing a particulate substrate, a resin, and a fibrous material;

combining, the particulate substrate, the resin, and the fibrous material wherein the resin coat coats the substrate with a coating of the resin and fibrous material, and, subsequent to the combining, solidifying the resin.

42. The method of claim 41, wherein the particulate substrate is combined with the fibrous material to form a mixture and then the resin is added to the mixture.

43. The method of claim 41, wherein the resin is coated onto the particulate substrate and then the fibrous material is added to the resin coated particulate substrate.

44. The method of claim 41, wherein the resin is added to sand heated to a temperature sufficient to melt the resin and form a mixture, and then a crosslinking agent is added to the mixture.

45. The method of claim 41, wherein the resin is mixed with a liquid to form a resin-containing mixture and the resin-containing mixture is mixed with the particulate substrate and a crosslinking agent to form a coating mixture, and then the liquid is removed from the coating mixture.

46. The method of claim 45, wherein the liquid is a solvent and a solution is formed by mixing the resin and the solvent such that the resin-containing mixture is a resin-containing solution, the resin-containing solution is mixed with the particulate substrate and the crosslinking agent to form the coating mixture, and then the solvent is removed from the coating mixture.

47. A method of treating a hydraulically induced fracture in a subterranean formation surrounding a wellbore comprising introducing into the fracture proppant particles of claim 39.

48. A method of treating a subterranean formation having a wellbore to prevent particulates from the subterranean formation from flowing back into surface equipment comprising introducing into the wellbore particles of claim 37, comprising a particulate substrate and a coating, the coating comprising resin and fibrous material.

49. A method of making a proppant particle of claim 37, comprising the steps of:

providing a particulate substrate, a resin, and a fibrous material;

combining, the particulate substrate, the resin, and the fibrous material wherein the resin coat coats the substrate with a coating of the resin and fibrous material, and, subsequent to the combining, solidifying the resin.

* * * * *